(12) United States Patent
Sanz et al.

(10) Patent No.: US 8,578,978 B2
(45) Date of Patent: Nov. 12, 2013

(54) DEVICE FOR LOADING PARTICLES OF CATALYST INTO TUBES HAVING AN ANNULAR ZONE

(75) Inventors: Elena Sanz, Lyons (FR); Robert Beaumont, Rillieux la Pape (FR); Jérôme Colin, Versailles (FR); Fabrice Giroudiere, Orlienas (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 517 days.

(21) Appl. No.: 12/896,444

(22) Filed: Oct. 1, 2010

(65) Prior Publication Data

US 2011/0083769 A1 Apr. 14, 2011

(30) Foreign Application Priority Data

Oct. 1, 2009 (FR) ...................................... 09 04683

(51) Int. Cl.
*B01J 8/06* (2006.01)
(52) U.S. Cl.
USPC ......... 141/237; 141/1; 141/7; 141/65; 141/71
(58) Field of Classification Search
USPC ............... 141/1, 5, 7, 65, 71–72, 94–95, 234, 141/237–239, 247
See application file for complete search history.

(56) References Cited

U.S. PATENT DOCUMENTS

| | | | | |
|---|---|---|---|---|
| 3,223,490 A | * | 12/1965 | Sacken et al. | 141/237 |
| 4,022,255 A | * | 5/1977 | Pegels et al. | 141/1 |
| 4,402,349 A | * | 9/1983 | Engert et al. | 141/9 |
| 4,402,643 A | * | 9/1983 | Lytton et al. | 414/160 |
| 4,461,327 A | * | 7/1984 | Magin et al. | 141/1 |
| 4,701,101 A | * | 10/1987 | Sapoff | 414/804 |
| 5,626,455 A | * | 5/1997 | Keller et al. | 414/288 |
| 5,890,868 A | * | 4/1999 | Comardo | 414/587 |
| 5,897,282 A | * | 4/1999 | Comardo | 141/232 |
| 5,906,229 A | * | 5/1999 | Haquet et al. | 141/286 |
| 6,032,828 A | * | 3/2000 | Gicza et al. | 222/1 |
| 6,132,157 A | * | 10/2000 | Comardo | 141/232 |
| 6,170,670 B1 | * | 1/2001 | Kato et al. | 209/325 |
| 6,981,422 B1 | * | 1/2006 | Comardo | 73/756 |
| 6,981,529 B2 | * | 1/2006 | Fry | 141/67 |
| 7,439,455 B2 | * | 10/2008 | Fry | 177/59 |
| 7,605,333 B2 | * | 10/2009 | Elliott et al. | 141/83 |

(Continued)

FOREIGN PATENT DOCUMENTS

| FR | 2 918 904 A1 | 1/2009 |
|---|---|---|
| WO | WO 98/02238 A1 | 1/1998 |
| WO | WO2009/024664 A1 | 2/2009 |

OTHER PUBLICATIONS

International Search Report and Written Opinion, Date of Completion Apr. 6, 2010, 6pages.

*Primary Examiner* — Gregory Huson
*Assistant Examiner* — Nicolas A Arnett
(74) *Attorney, Agent, or Firm* — Millen, White, Zelano & Branigan, P.C.

(57) ABSTRACT

A device and method to load particles of catalyst on the order of cm in the principal dimension into an annular zone of reaction tubes which may reach a height of more than 10 meters, while satisfying the strict conditions of homogeneity and density of loading.

15 Claims, 3 Drawing Sheets

(56) References Cited

U.S. PATENT DOCUMENTS

| | | | |
|---|---|---|---|
| 7,836,919 B2 * | 11/2010 | Johns et al. | 141/1 |
| 7,878,225 B2 * | 2/2011 | Johns et al. | 141/65 |
| 7,913,543 B2 * | 3/2011 | Johns et al. | 73/49.5 |
| 8,025,472 B2 * | 9/2011 | Fry | 141/286 |
| 8,166,811 B2 * | 5/2012 | Johns | 73/149 |
| 8,287,227 B2 * | 10/2012 | Fry | 141/286 |
| 8,336,586 B2 * | 12/2012 | Johns | 141/337 |
| 2001/0041117 A1 * | 11/2001 | Comardo | 141/232 |
| 2006/0243342 A1 * | 11/2006 | Barth et al. | 141/12 |
| 2009/0145727 A1 | 6/2009 | Johns | |
| 2010/0254891 A1 * | 10/2010 | Giroudiere et al. | 423/648.1 |

* cited by examiner

DEVICE FOR LOADING PARTICLES OF CATALYST INTO TUBES HAVING AN ANNULAR ZONE

FIELD OF THE INVENTION

The present invention relates to the field of devices that can be used to load catalyst present in the form of solid particles into multitubular reactors.

The particular nature of the loading medium concerned in the present invention is that it is constituted by the annular zone comprised between an outer tube and an inner tube.

This type of tube is usually termed a "bayonet" tube. The catalyst itself is constituted by particles that are generally cylindrical in shape, with a diameter of approximately 1 to 2 cm, and a length in the range 0.5 cm to 2 cm.

The present invention is not linked to a particular chemical reaction, but more generally concerns any reactor that uses bayonet tube type tube technology.

As an example, the reactors with which the present invention are concerned are large capacity natural gas steam reforming reactors for the production of synthesis gas (typically 100000 $Nm^3/h$). Such reactors are typically constituted by an assembly of approximately 200 to 300 tubes 15 meters in height enclosed in a shell that may reach 15 meters in diameter.

A major problem encountered in loading such multitubular reactors is that of homogeneity of the density of loading between the various catalytic tubes.

Any heterogeneity in loading will result in a difference in the density of loading that may produce preferential passages from one tube to another, or even within the same tube. It is essential that the loading method employed ensures good homogeneity of density between the various catalytic tubes.

The loading method associated with the device must also be reproducible and sufficiently rapid so that the loading time remains within reasonable limits.

EXAMINATION OF THE PRIOR ART

The prior art in the field of loading catalytic reactors is represented by two major types of loading, termed "dense" loading and "sock" loading. The first of these loading techniques consists in distributing the particles of catalyst inside the reactor by causing said particles to rotate and to allow them to fall in the manner of raindrops.

That method results in dense, homogeneous loading but requires equipment for causing rotation that can distribute the catalyst over several radii in order to cover all of the catalytic section properly.

The other method, termed "sock" loading, consists in introducing the particles of catalyst into the reactor through a flexible sock that is gradually lifted upwards as the level of particles of catalyst that are dispensed rises in the reactor. That method results in less dense loading than in "dense" loading, but the equipment is simpler.

The references below describe in more detail certain other loading methods used for industrial reactors:
  UNIDENSE catalyst loading for steam reformers, published in 2008 in a commercial brochure from Johnson Matthey;
  Damand M B, Erikstrup N H B, Marcher J, Nielsen H C L T and Kelling D: Loading of steam reforming reactors using the "Spiraload Method", in Ammonia Technical Manual 2003, an article by Haldor Topsoe;
  "Spiraload Technology" 2008, in the commercial brochure by Haldor Topsoe.

The prior art methods do not deal with the problem of loading catalyst inside tubes having an annular zone defined between an outer tube and an inner tube, termed bayonet tubes by the skilled person, in a satisfactory manner.

The space available in the annular zone of a bayonet tube is typically of the order of 50 mm, i.e. about half that of a simple tube with a diameter of 100 mm. Further, the need to maintain the constancy of the annular space, i.e. good concentricity between the inner tube and the outer tube, means that elements termed centralizers have to be installed between the outer tube and the inner tube, which centralizers are constituted, for example, by tabs fixed to one of the tubes, or tie rods connecting the walls of the inner and outer tubes.

Generally, said centralizers are 2 to 6 in number, and preferably 3 in number, over a given section. For a 15 m long bayonet tube, it may be necessary to distribute these centralizers over 4 or 5 levels distributed in a regular manner along the tube.

In the remainder of the text, the term "angular sector" will be used to designate the portion of space included between two consecutive centralizers.

The constraints on loading catalyst particles into a bayonet tube provided with centralizers may be summarized as follows:
  breakage of the particles under the effects of falling from too great a height (typically more than 5 m) must be avoided;
  jamming of particles inside the loading tube must be avoided;
  the particles must be prevented from leaving the loading tube in groups, as experience has shown that when a group of particles leaves the loading tube simultaneously, there is a high risk of arch formation.

This set of constraints means that the method of the present invention is a method that uses "grain-by-grain" loading and which necessitates a rigorous selection of the diameter of the loading tube with respect to the dimensions of the catalyst particles.

If dmax denotes the largest dimension of a vat particle or grain, and dmin denotes the smallest dimension of said particle, it has been shown that in order to avoid phenomena of jamming when groups of particles flow out while ensuring grain-by-grain flow within the loading tube, the following conditions must be satisfied for the diameter of the loading tube Dt and the dimensions dmax and dmin of the particle:

Dt must be both greater than 1.1 times dmax and less than 2 times dmin.

BRIEF DESCRIPTION OF THE INVENTION

Figure 1:
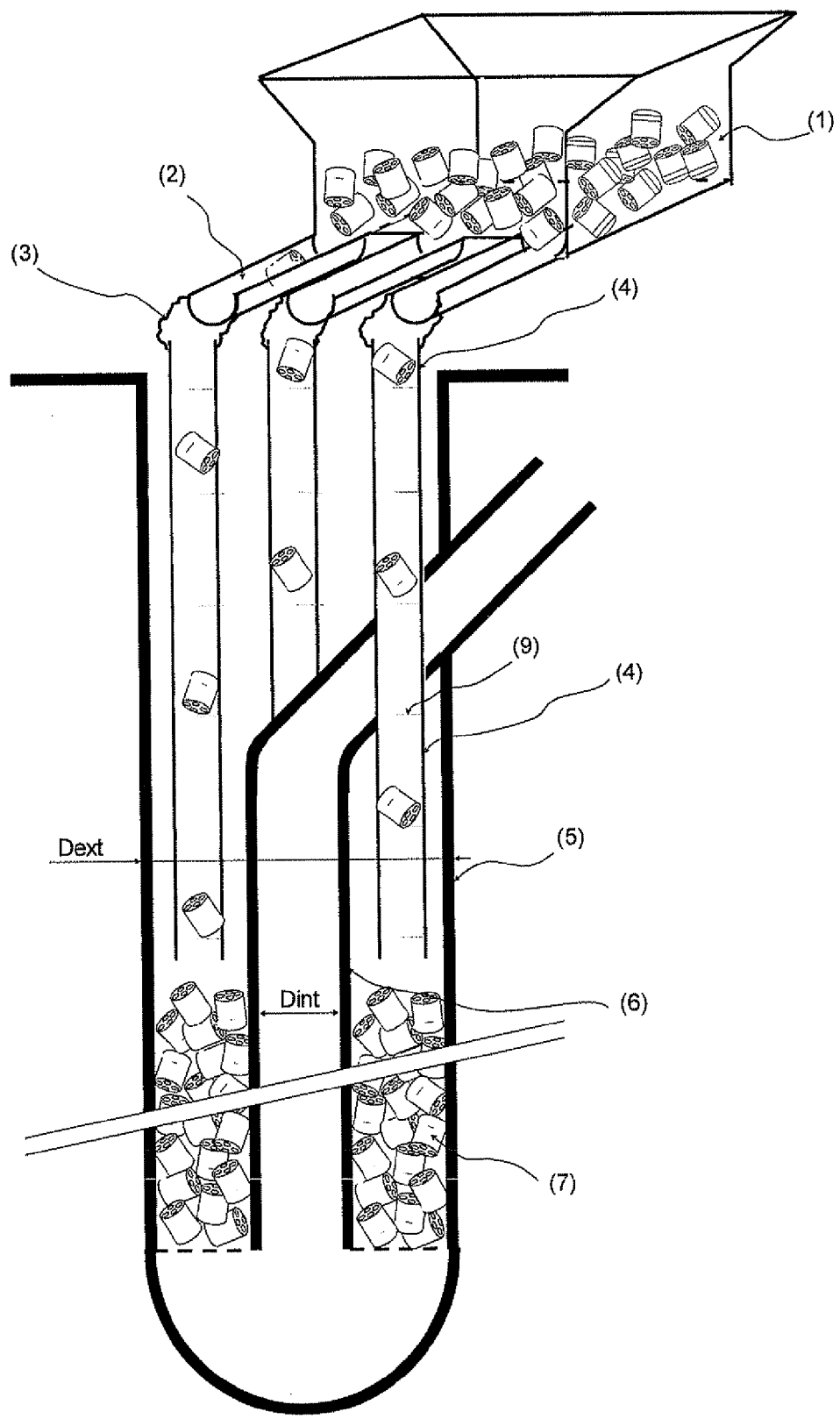
FIG. 1 is a diagrammatic view of a device in accordance with the present invention, showing the principal characteristics thereof.

The present invention can be defined as a device for loading particles of catalyst into the annular space of a bayonet type tube. A bayonet tube is usually defined as being constituted by an outer tube with diameter Dext and an inner tube, concentric with the outer tube, with diameter Dint. The annular space included between the outer tube and the inner tube constitutes the catalytic annular zone to be filled with particles of catalyst.

Such bayonet tubes are typically used in reactors for steam reforming various hydrocarbon feeds, especially natural gas; they are then in the form of a plurality of 200 to 300 tubes enclosed in a shell that may be up to 15 meters in diameter.

Clearly, the device described in the present invention may be duplicated for the desired number of times in order to ensure simultaneous loading of several bayonet tubes.

The present invention is not linked to a particular shape of the catalyst particles.

In particular, the catalyst particles may have the form of small cylinders (7) that may possibly be perforated with small channels in order to increase the specific surface area of said particles.

It is only necessary to distinguish the largest dimension, denoted dmax, in the catalyst particle, and the smallest dimension, denoted dmin. The nub of the invention is the rigorous sizing of the loading tubes via which the catalyst particles are introduced into each of the sectors of the annular zone.

The diameter of the loading tubes must be just larger than the largest dimension of the catalyst particles while also being less than 2 times the smallest dimension of said particles. The term "just larger" means a value of 1.1 times the largest dimension of the particles.

In order to ensure good concentricity of the inner and outer tubes, elements termed "centralizers" connect the inner wall of the outer tube and the outer wall of the inner tube.

Said centralizers are present in a number in the range 2 to 6 per section, preferably in a number of 3 per section of reaction tube.

Said centralizers are distributed along the bayonet tube and also contribute to its rigidity, which is an important aspect of good operability of the reactor.

The loading device of the present invention can thus allow loading of catalyst particles into the annular zone of a bayonet tube the annular section of which is divided into N angular sectors by elements termed centralizers, said device comprising:

a hopper for loading catalyst particles, located outside the plurality of tubes;

a set of N vibrating chutes connected to the lower portion of the hopper and to N loading tubes, each loading tube supplying one angular sector and to N loading tubes, each loading tube supplying one angular sector and having a diameter Dt of more than 1.1 times the largest dimension of the catalyst particles, and less than 2 times the smallest dimension of the catalyst particles, the length of a loading tube initially being substantially equal to the length of a bayonet tube a set of N flexible connection elements connecting each vibrating chute to a loading tube, thereby allowing an appropriate change of direction.

The term "length of the loading tube substantially equal to that of the bayonet tube" means that the length of loading tube is less than that of the bayonet tube by less than 1 meter, and preferably by less than 0.5 meter.

In general, the number of angular sectors is in the range 3 to 6; preferably, it is 3.

In a variation of the present invention, the device may be completed by a system for extracting fine particles.

In another variation of the present invention, the device may be completed by a system for braking particles intended to limit their velocity as they descend in the loading tube, generally disposed vertically or substantially vertically.

This system for braking catalyst particles may consist of cylindrical elements disposed perpendicular to the axis of said loading tube and fixed to the wall of said tube with a vertical spacing of 1 meter plus or minus 10 cm.

The term "substantially vertical" means that the bayonet tube (and thus the associated loading tube) makes an angle of plus or minus 30° with respect to the vertical.

The loading device of the invention can carry out loading at a homogeneous density over the entire length of the bayonet tubes as well as between the various bayonet tubes constituting the catalytic zone of the reactor.

The invention also pertains to the method for using the device that is described in the next paragraph.

DETAILED DESCRIPTION OF THE INVENTION

Figure 2:
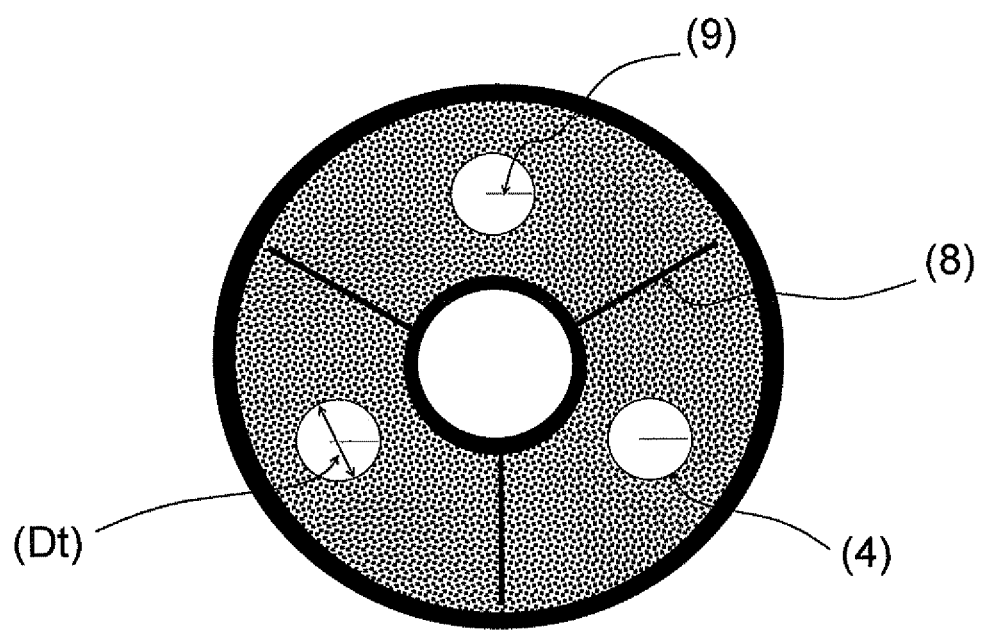
FIG. 2 is a top view showing the angular sectors and the position of each sector of the loading tube.

The device for loading particles of catalyst into the annular zone of a bayonet tube comprises the following elements which are described in the order in which the catalyst particles advance. The numbers refer to FIGS. 1 and 2:

a loading hopper (1), which may be of any type known to the skilled person;

a set of N vibrating chutes (2) one end of which penetrates into the lower zone of the loading hopper (1), with the other end being in communication with each loading tube (4) via flexible connection elements (3);

a set of N loading tubes (4) penetrating into each angular sector which is delimited by centralizers (8), the diameter Dt of one loading tube satisfying two conditions, a) more than 1.1 times the largest dimension, of the particles to be loaded, and b) less than 2 times the smallest dimension, of the particles to be loaded.

Figure 3:
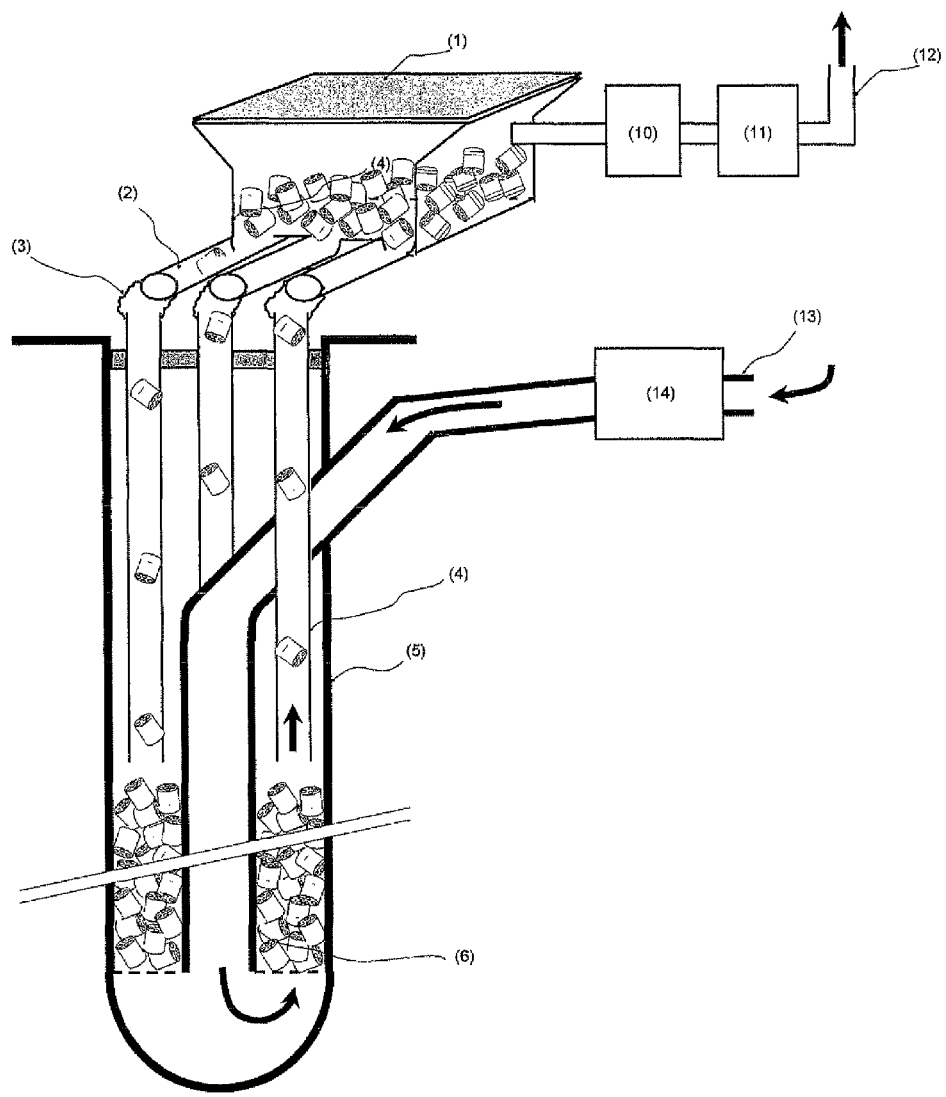
FIG. 3 is a diagrammatic view of the device of the present invention equipped with the optional system for extracting fine particles and braking the catalyst particles using a counter-current of gas.

This set may be completed by a system for extracting fine particles of catalyst (10, 12 in FIG. 3).

In order to slow down the fall of particles of catalyst inside the loading tube, generally vertically disposed, it may be necessary to provide a braking system for said particles. As an example, it is possible to use, as a braking system, cylindrical elements of flexible material (sort of "cilia") disposed perpendicular to the axis of said loading tube, denoted (9) in FIG. 1, and fixed to the wall of said tube with a vertical spacing of approximately 1 meter, the spacing being variable as a function of the fragility of the catalyst to be loaded.

Another example of braking is the use of a rising stream of air created by aspiration (11), (12), or blowing the air (denoted (13), (14) in FIG. 3).

Regardless of the means for circulating air that is used, a filtration device (10) can be used to retain the fine particles of catalyst that may be entrained. The term "fine particles of catalyst" means fragments of particles deriving from attrition, and which have a dimension of less than 1 mm.

Any other system for slowing down the fall of the particles may clearly be envisaged and is also encompassed in the scope of the invention.

After loading the bayonet tubes, the quality of loading is verified by measuring the pressure drop ($\Delta P$) of the catalytic bed filling the annular zone, i.e. between the inlet to the bayonet tube on the catalyst side (upper end of annular space) and the outlet from the bayonet tube (upper end of the inner tube).

The measurement of $\Delta P$ is carried out by causing a flow of air to pass through the tube loaded with catalyst. Good loading corresponds to a deviation in $\Delta P$ between two tubes of less than ±5% with respect to the mean, which ensures a homogeneous distribution of particles of catalyst between the various tubes.

The method for loading a bayonet tube consists of the following series of steps:
- loading catalyst into the loading hopper;
- passing the grains into N vibrating chutes;
- "grain-by-grain" loading into the N loading tubes;
- shortening the loading tubes when the height of the layer of loaded particles approaches the lower end of the loading tube by a distance of less than 1 meter, and preferably less than 0.5 meter;
- verifying the quality of loading by measuring the pressure drop, causing air to circulate in the catalytic bed filling the annular zone, the measurement of ΔP being taken between the upper end of the annular space filled with catalyst and the upper end of the inner tube, substantially at the same level.

EXAMPLE IN ACCORDANCE WITH THE INVENTION

One Considers a steam reforming reactor intended for the production of 100000 Nm$^3$/hour of synthesis gas, composed of a multiplicity of bayonet tubes, each bayonet tube being formed by a concentric inner tube and outer tube. There are 3 centralizers per section of tube, the various centralizers being aligned along the bayonet tube, and thereby defining 3 angular sections:
- internal diameter of outer tube (5): Dext=150 mm;
- external diameter of inner tube (6): Dint=50 mm;
- dimension of annular space: e=50 mm;
- length of bayonet tube: Lb=12 m;
- diameter of reactor: 10 meters;
- number of angular sectors: N=3;
- number of bayonet tubes: 280.

The dimensions of the catalyst particles with a cylindrical shape were:
- minimum diameter=9 mm;
- maximum diameter=16 mm The loading device was constituted by:
- loading hopper;
- number of vibrating chutes: N=3;
- number of loading tubes: N=3;
- diameter of loading tubes: Dt=18 mm;
- initial length of loading tube Lt=11 m
- silicone cylinder braking device, disposed every 50 cm.

Each loading tube was composed of an assembly of 11×1 meter sections.

When the height of the catalytic bed in the annular zone increased, the sections were lifted gradually in order to shorten the total length of the loading tube and thereby to keep the fall height for the particles below 1 meter.

The height of the fall is determined as the distance separating the upper end of the layer of particles already loaded into the annular zone and the outlet end of the loading tube.

Four loading operations, denoted 1, 2, 3 and 4, were made with the device of the invention.

The results in terms of density of the bed of catalyst (kg/m$^3$) and pressure drop (ΔP in mbar, i.e. $10^{-3}$ bar=$10^2$ pascals) were as follows:

|  | Loading operation | | | |
|---|---|---|---|---|
|  | 1 | 2 | 3 | 4 |
| Mass of loaded grains (kg) | 189 | 187 | 187 | 183 |
| Loading height (mm) | 11850 | 11850 | 11850 | 11850 |
| Loading volume (liter) | 186 | 186 | 186 | 186 |
| Bed density (kg/m$^3$) | 1017 | 1003 | 1003 | 981 |
| Air flow rate (m$^3$/h) | 70 | 70 | 70 | 70 |
| ΔP (mbar) | 183.2 | 177.7 | 180.3 | 171.2 |
| Mean deviation of ΔP/mean ΔP | +2.86% | −0.21% | +1.22% | −3.87% |

The loading time for one tube was approximately half an hour.

The total time for loading all of the 280 tubes was 35 hours, grouping the bayonet tubes in groups of 70. Four loading devices were used in parallel.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure[s] of all applications, patents and publications, cited herein and of corresponding French application Ser. No. 09/04.683, filed Oct. 1, 2009 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for loading particles of catalyst into the annular zone of a bayonet tube having an outer tube and an inner tube, said annular zone having an external diameter Dext and an internal diameter Dint, said annular zone being divided into N angular sectors by elements termed centralizers, said device comprising:
 a hopper for loading catalyst particles;
 a set of N loading tubes and a set of N chutes connected to a lower portion of the hopper and to said N loading tubes, each loading tube for supplying one angular sector and having a diameter Dt of more than 1.1 times the largest dimension of the catalyst particles, and less than 2 times the smallest dimension of the catalyst particles, the length of a loading tube initially being substantially equal to the length of said bayonet tube;
 a set of N flexible connection elements connecting each chute to a loading tube, thereby allowing an appropriate change of direction.

2. A device for loading catalyst particles into the annular zone of a bayonet tube according to claim 1, in which the number N of angular sectors and the number N of loading tubes is 3.

3. A device for loading catalyst particles into the annular zone of a bayonet tube according to claim 2, in which the device further comprises a system for the extraction of fine particles (10), (12).

4. A device for loading catalyst particles into the annular zone of a bayonet tube according to claim 1, in which the loading tubes are provided with systems for braking particle velocity, said system comprising cylindrical elements disposed perpendicular to the axis of said loading tube and fixed to the wall of said tube with a vertical spacing of 1 meter plus or minus approximately 10 cm.

5. A device according to claim 4 wherein said chutes are vibrating chutes.

6. A device for loading catalyst particles into the annular zone of a bayonet tube according to claim 4, in which the device further comprises a system for the extraction of fine particles (10), (12).

7. A device according to claim 6 wherein said chutes are vibrating chutes.

8. A device for loading catalyst particles into the annular zone of a bayonet tube according to claim 1, in which the device further comprises a system for the extraction of fine particles (10), (12).

9. A device according to claim 8 wherein said chutes are vibrating chutes.

10. A method for loading catalyst particles into the annular zone of a bayonet tube using the device according to claim 1, comprising the following series of steps:
    loading a catalyst into the loading hopper;
    passing the grains into N chutes;
    grain-by-grain loading into the N loading tubes;
    shortening the loading tubes when the height of the layer of loaded particles approaches the lower end of the loading tube by a distance of less than 1 meter, and
    verifying the quality of loading by measuring the pressure drop, causing air to circulate in the catalytic bed filling the annular zone, the measurement of said pressure drop being taken between the upper end of the annular space filled with catalyst and the upper end of the inner tube, substantially at the same level.

11. A method according to claim 10 wherein the height of the layer of loaded particles approaches the lower end of the loading tube by a distance of less than 0.5 meter.

12. A device according to claim 1 wherein said chutes are vibrating chutes.

13. A device according to claim 1, wherein said particles are cylindrical and have a minimum diameter of 9 mm and maximum diameter of 16 mm.

14. In a device for loading particles of catalyst into the annular zone of a bayonet tube having an outer tube and an inner tube, said annular zone having an external diameter Dext and an internal diameter Dint, said annular zone being divided into N angular sectors by elements termed centralizers, the improvement comprising:
    a set of N loading tubes, each loading tube for supplying one angular sector and having a diameter Dt of more than 1.1 times the largest dimension of the catalyst particles, and less than 2 times the smallest dimension of the catalyst particles, the length of a loading tube initially being substantially equal to the length of said bayonet tube.

15. A device according to claim 14, wherein said particles are cylindrical and have a minimum diameter of 9 mm and maximum diameter of 16 mm.

* * * * *